J. PULLAR.
DUMP WAGON.
APPLICATION FILED SEPT. 10, 1920.
1,416,975.
Patented May 23, 1922.
2 SHEETS—SHEET 1.
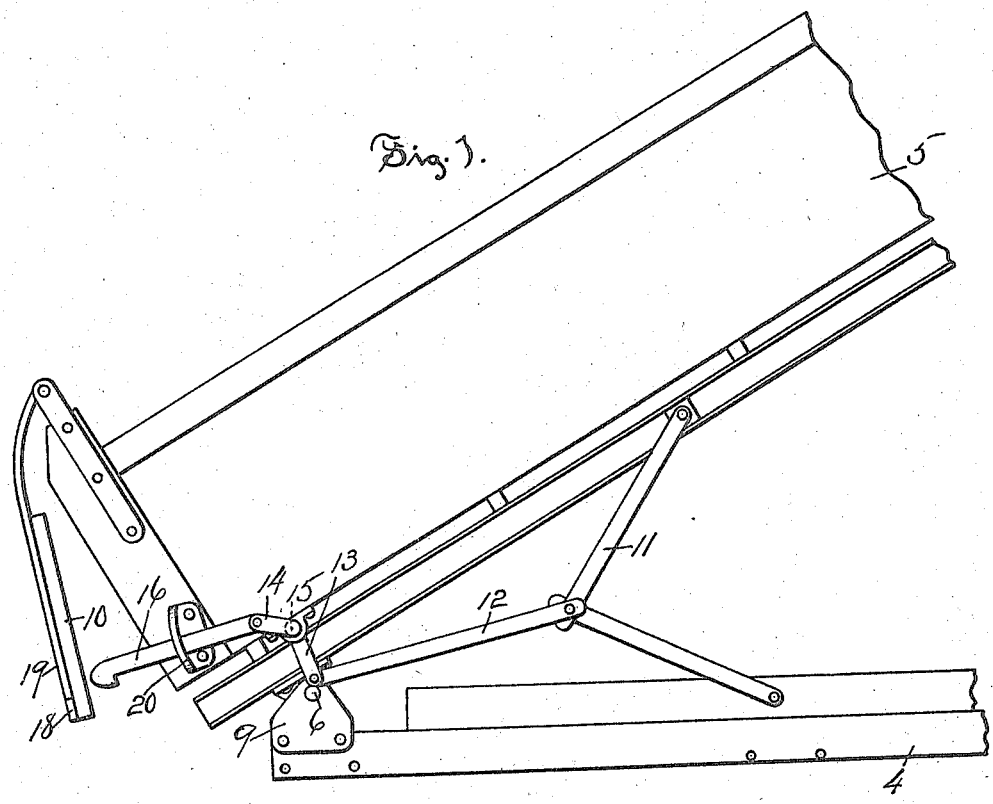
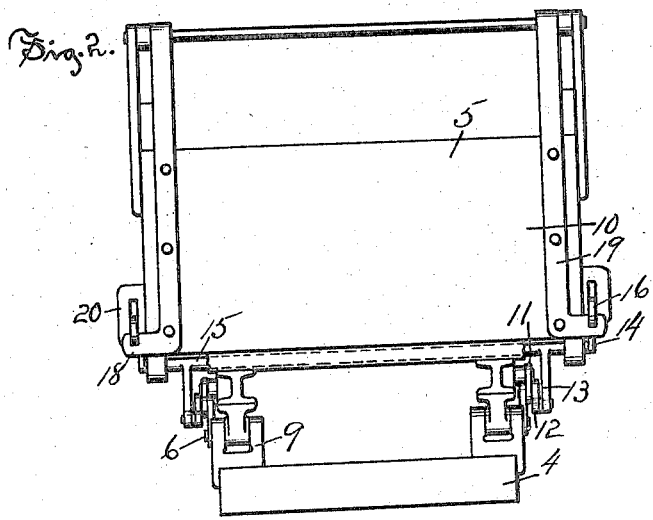
INVENTOR.
James Pullar,
BY Arthur B. Jenkins,
ATTORNEY.

J. PULLAR.
DUMP WAGON.
APPLICATION FILED SEPT. 10, 1920.
1,416,975.
Patented May 23, 1922.
2 SHEETS—SHEET 2.
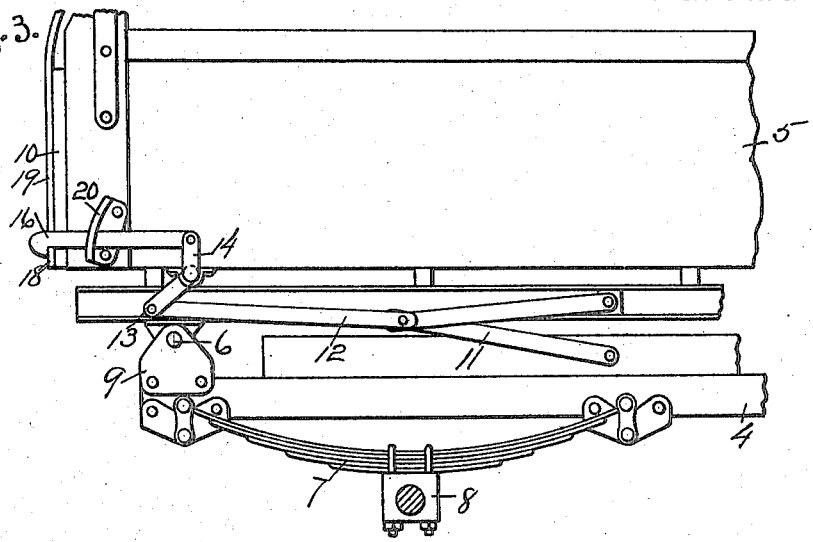
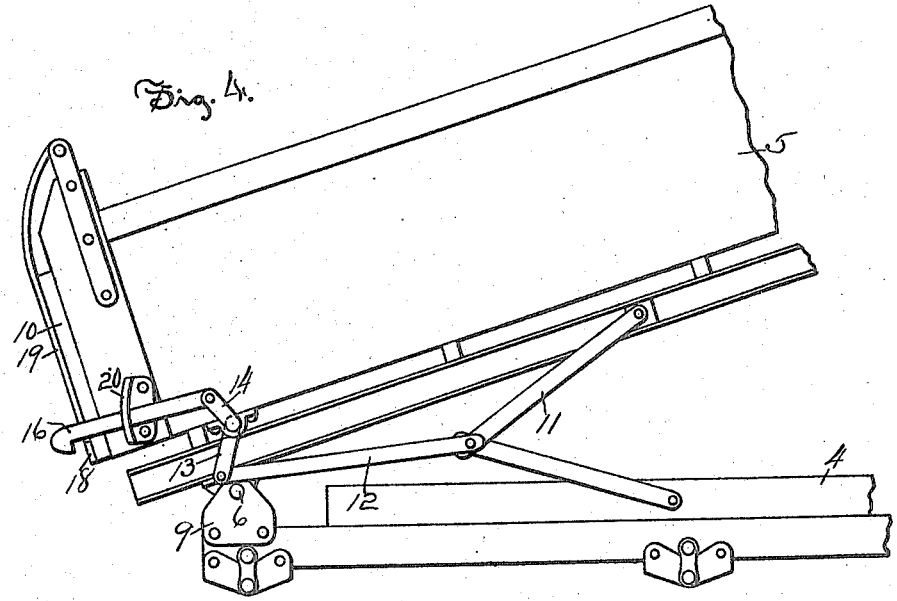
INVENTOR.
James Pullar.
BY Arthur B Jenkins
ATTORNEY.

UNITED STATES PATENT OFFICE.

JAMES PULLAR, OF HARTFORD, CONNECTICUT.

DUMP WAGON.

1,416,975. Specification of Letters Patent. Patented May 23, 1922.

Application filed September 10, 1920. Serial No. 409,305.

*To all whom it may concern:*

Be it known that I, JAMES PULLAR, a citizen of the United States, and a resident of Hartford, in the county of Hartford and State of Connecticut, have invented a new and Improved Dump Wagon, of which the following is a specification.

My invention relates to that class of wagons in which the body is tipped for the purpose of discharging a load therefrom, and an object of my invention, among others, is to provide such a wagon with means for automatically controlling the opening and securing of the tail board in a simple and efficient manner.

One form of mechanism embodying my invention and in the construction and use of which the objects herein set out, as well as others, may be attained, is illustrated in the accompanying drawings, in which—

Figure 1 is a side view of such part only of the frame and body or box of a wagon as is necessary to an understanding of my invention, the body being shown in a raised position.

Figure 2 is an end view of the same, the box being shown in its lowered or normal position.

Figure 3 is a side view of my improved wagon showing the box in its lowered or normal position.

Figure 4 is a similar view but showing the box partially raised.

In the accompanying drawings the numeral 4 indicates a portion of the frame or chassis of a vehicle and 5 the box or body hinged at 6 to the frame in a manner common to vehicles of this class, the frame being suitably attached and secured to springs 7 secured to an axle 8 (see Figure 3), and the hinges being formed as in brackets 9 secured to the frame, as shown in Figure 2, the wheels and the body having any common means for raising the front end of said body, all of which will be readily understood by those skilled in the art without further description and illustration herein, a tail board 10 being suitably pivotally secured to the side parts of the wagon in any desired manner.

In carrying my invention into effect I provide a pair of toggle levers 11, there being preferably a pair of these levers at each side of the body, the mechanism now to be described being preferably duplicated at opposite sides of the body, one such mechanism only however being necessary to embody my invention, and one only therefore being described herein.

Each member of said pair of toggle levers is pivotally attached at one end, to the wagon body and the other end to a side part of the frame 4, the other ends of each of said members being pivotally secured together. A tail board releasing rod 12 is pivotally secured at one end to the toggle levers at the joint between the members, the opposite end of said rod being pivotally attached to one arm 13 of a bell crank lever. The other arm 14 of the bell crank lever is connected to the arm 13 as by a shaft 15, which shaft may be employed as a connection between the arms of bell crank levers located at opposite sides of the wagon frame, when the mechanism is duplicated at opposite sides of the frame, as shown herein.

A latch 16 is pivotally secured at one end to the arm 14, the opposite hooked end of said latch being arranged to engage a lug 18 secured to and projecting from the tail board, in the construction herein shown this lug being formed as an integral part projecting from one end of a tail board strap 19, the opposite end of which strap serves as a part of the hinge for pivotally securing the tail board in place. In the apparatus as disclosed herein the latch is caused to move properly to effect its functions by a controller 20 in the form of a plate secured to and projecting from the body 5 and having a slot through which the latch projects, as shown in Figure 2 of the drawings.

In the operation of the device, the body being in its lowered position, as shown in Figure 3, and the nose of the latch engaging the lug 18 on the tail board, securely holding the latter in place, as the front end of the body 5 is raised the members of the toggle lever will be moved towards a straightened position, and this will move the rod 12 lengthwise and effect a turning movement of the bell crank lever that will lift the nose of the latch 16 and free it from engagement with the lug 18, and, this will permit the tail board to swing freely outward and permit any material within the wagon body to slide out when the body has been raised to a sufficiently inclined position, and when the body is again lowered and the tail board automatically swings inwardly the lug 18 will strike the rounded end of the latch and raise it so that the lug may pass under the nose of the latch and again be engaged thereby.

I claim—

1. A frame, a wagon body pivotally mounted on said frame, a tail-board pivotally connected to said body, toggle levers pivotally connected to the frame and body, a longitudinally movable and vertically swinging latch for holding the tail-board in its closed position, and a connection between said levers and said latch for operating the latter by the tipping movement of the body, which tipping movement operates said toggle levers.

2. A frame, a wagon body pivotally mounted on said frame, toggle levers connecting said frame and body, a tail board pivotally attached to said body, means for holding the tail board in its closed position, a bell crank lever connected with said holding means, and an operative connection between said bell crank lever and said toggle levers for operation of the former by the latter to operate said holding means.

3. A frame, a wagon body pivotally mounted on said frame, toggle levers connecting said frame and body, a tail board pivotally attached to said body, means for holding the tail board in its closed position, a bell crank lever connected with said holding means, and a releasing rod pivotally connected to the toggle levers at the joint thereof and to said bell crank lever for operation of said holding means.

JAMES PULLAR.